Feb. 2, 1954

O. H. CAMPBELL 2,668,024

SPINNING REEL

Filed July 29, 1950

INVENTOR
Opie H. Campbell
BY
Pennie, Edmonds, Morton and Barrows
ATTORNEYS

Feb. 2, 1954     O. H. CAMPBELL     2,668,024
SPINNING REEL

Filed July 29, 1950     3 Sheets-Sheet 2

INVENTOR
Opie H. Campbell
BY
Pennie, Edmonds, Morton and Barrows
ATTORNEYS

Feb. 2, 1954     O. H. CAMPBELL     2,668,024
SPINNING REEL
Filed July 29, 1950     3 Sheets-Sheet 3
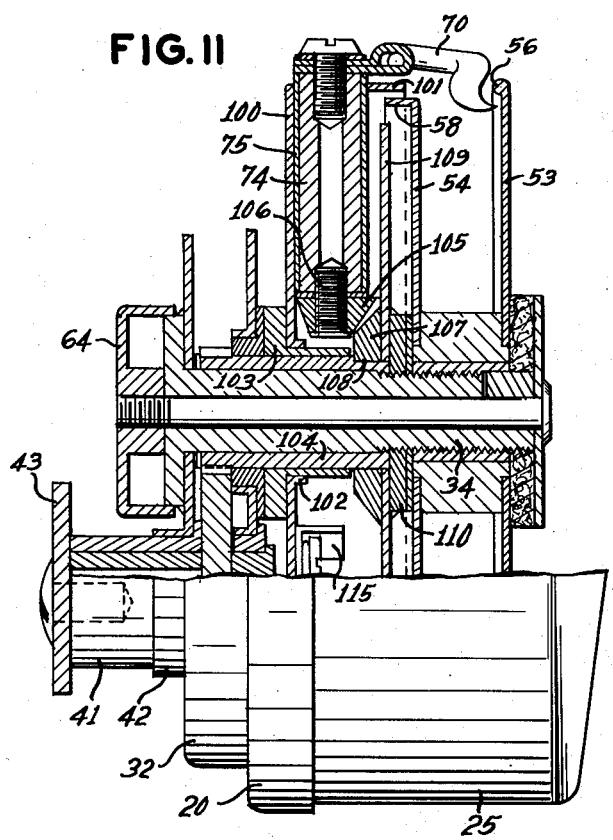
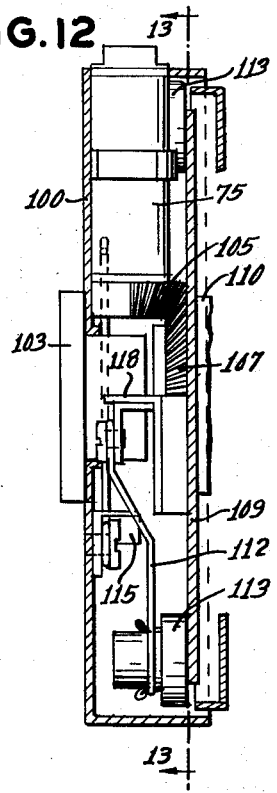
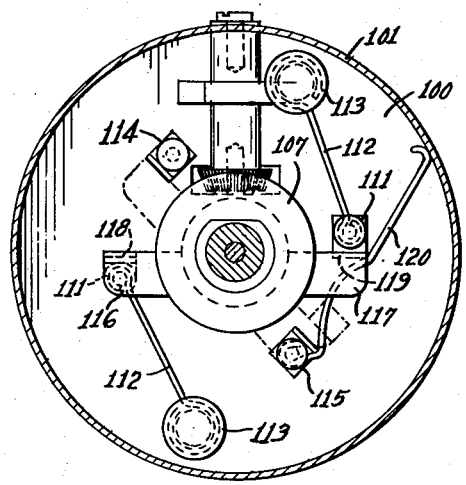
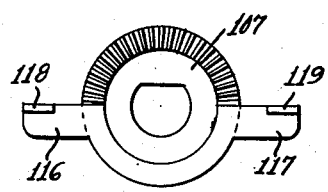
INVENTOR
Opie H. Campbell
BY
ATTORNEYS

Patented Feb. 2, 1954

2,668,024

UNITED STATES PATENT OFFICE 2,668,024

SPINNING REEL

Opie H. Campbell, Missoula, Mont.

Application July 29, 1950, Serial No. 176,644

11 Claims. (Cl. 242—84.5)

This invention relates to fishing reels and more particularly to the type of fishing reels known as spinning reels. The primary difference between a conventional fishing reel and a spinning reel is that in the former the spool for the fishing line rotates to permit withdrawal of line from it and must be counter-rotated in order that line may be rewound upon it, while in the latter the spool is usually stationary, at least during casting, and line is withdrawn from it over one end of the spool and is rewound upon the spool by a rotating member independent of the spool. In spinning reels the problem of backlash which is present with conventional reels is entirely eliminated.

While a spinning reel, as a type of fishing reel, is not new, I believe that the reels of this invention contain many advantageous features not heretofore found in spinning reels.

A spinning reel according to my invention comprises a casing having a hollow spindle secured to it which extends substantially forwardly of it. A hollow drive shaft is mounted on the spindle adjacent the casing and is provided at its rear end with a gear. Also mounted on the casing is a crank which when rotated turns a drive gear which engages the previously-mentioned gear on the drive shaft, thereby serving to rotate the drive shaft about the spindle. A drum, on the peripheral wall of which is supported a line hook, is mounted on the drive shaft concentric therewith and is adapted to be rotated either by being directly secured to the drive shaft or through intermediate means. The outer end of the hollow spindle beyond the drive shaft is adapted to support a spool the front wall of which has an inwardly directed peripheral projection. The line hook supported on the peripheral wall of the drum is supported there on the outer end of what may be termed a line hook shaft which extends substantially radially of the drum and through the peripheral wall thereof. This line hook shaft is rotatably supported in a bushing and at its inner end is provided with means whereby it may be rotated through a limited distance. Also provided is a means independent of the drum and supported by the drive shaft which is engageable with the means for rotating the line hook shaft so that when the drive shaft is rotated and there is relative movement between the line hook shaft rotating means and the means independent of the drum in one direction the line hook is moved into line pick-up position and when there is relative motion or movement in the opposite direction the line hook is retracted from line pick-up position.

The line hook is so shaped and is of such a size that when in line pick-up position its distal end extends beneath the inwardly directed projection on the periphery of the front wall of the spool. This assures that the line will be picked up upon rotation of the drum and the line hook, when the line hook is in line pick-up position.

The rear wall of the spool is preferably provided with a rearwardly extending peripheral flange which, when the spool is properly mounted on the spindle, extends beneath a portion of the peripheral wall of the drum. This tends to prevent the line from slipping behind the spool which is, of course, important if the reel is to function properly at all times.

In many spinning reels the spools are fixedly supported, that is, they are not permitted to rotate. This may be perfectly satisfactory when no load is going to be imposed upon the line being used which is sufficiently great to cause the line to break, but in many cases, of course, it is desirable to make use of a lightweight line which may be subjected to loads greater than that which it is capable of handling without breaking. Some spinning reels have been provided with rotatable spools and drag devices whereby the spools rotate only upon the imposition of a predetermined load upon the line. My invention contemplates the provision of such a rotatable spool in a spinning reel and a novel drag attachment whereby a varying degree of drag or resistance to rotation may be imposed upon the spool. Among the advantages of my drag attachment over those of the prior art is that it is operated from the same side of the reel as is the reel crank.

An additional advantage in the construction of my novel spinning reel is its adaptability, to temporary use at least, as either a right-hand or left-hand reel. Except for very minor modifications permanent left-hand or right-hand reels may be made from substantially the same parts.

The construction of a spinning reel according to this invention also permits easy removal of the spool and replacement thereof with another. This may be advantageous because in many cases it may be desirable to use different weight lines and by replacement of one spool having wound upon it a line of one weight with another having wound upon it a line of different weight, rewinding of a spool with a different line may be avoided.

These and further advantages of spinning reels constructed in accordance with my invention will be apparent from the following more specific description of two forms of spinning reels which come within the scope of my invention and which are illustrated in the accompanying drawings, in which:

Fig. 11 is an elevation, partly in section, and with part of the casing and cover broken away, of a modified form of spinning reel;

Fig. 12 is an elevation of a part of the reel of Fig. 11, showing more clearly the driving means for the drum, Fig. 13 is a sectional view taken along line 13—13 of Fig. 12; and, Fig. 14 is an elevational view of the bevel gear supported on and driven by the drive shaft.

Figure 1:
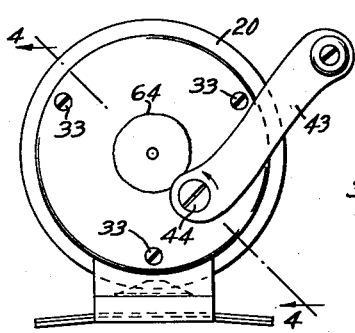
Figs. 1, 2 and 3 are elevational views showing the exterior appearance of the spinning reels.
Figure 2:
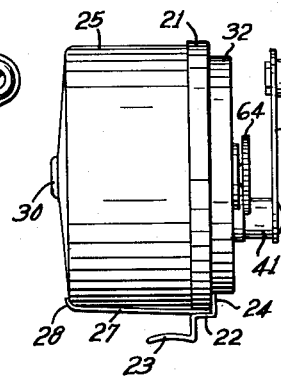
Figure 3:
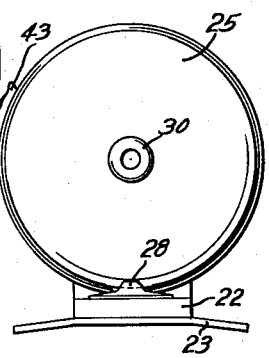

By reference first to Figs. 1 through 4, my spinning reel (one for left-hand operation) will be seen to comprise a casing 20 provided with a peripheral flange 21. A reel supporting bracket 22 having a rod-engaging spring portion 23 is secured to the casing 20 by having an arm 24 soldered, welded or by any other means attached to the casing.

A cover 25 is secured to the casing 20 by having its rear edge 26 received within flange 21 of the casing. A spring member 27 (Fig. 2), which may be a part of bracket 22 or may merely be secured thereto, extends forwardly below the cover member 25 and has at its outer end a bend 28 adapted to engage the front edge of the cover. An opening 29 is formed centrally in the front of the cover and contains a collar 30 of reasonably hard material through which fishing line is adapted to pass.

The casing 20 has a plurality of studs 31 secured to its rear face by which a gear housing 32 may be secured to it by screws 33. A hollow spindle 34, provided at one end with a flange 35, is supported by the casing 20 and by the gear housing 32, its flange 35 being welded or soldered to the outer face of the gear housing 32. This form of support serves also to strengthen the gear housing by bracing its central portion. The spindle 34 extends forwardly of the casing 20 and a substantial part of its forward end is threaded.

A hollow drive shaft 36 is supported on the rear portion of the hollow spindle 34 and is provided with a spur gear 37 secured to it as by welding. A crank shaft 38 having a flange 39 extends through an opening 40 in the casing 20, the flange 39 abutting the rim of the opening 40.

The crank shaft 38 is further supported by a bushing 41 which in turn is mounted in a flanged opening 42 in gear housing 32. A crank 43 is mounted on the outer end of crank shaft 38 by a screw 44 extending through it and threaded into the crank shaft. A driving gear 45 is mounted on the crank shaft 38, between the casing 20 and the gear housing 32, it being welded or soldered thereto and engaging the spur gear 37 secured to the drive shaft 36. Thus, by rotation of the crank 43 the drive shaft 36 is rotated on the spindle 34.

A line hook supporting drum 46 having a supporting web 47 and a hub 48 is mounted on the outer end of the drive shaft 36 and is adapted to be driven thereby by reason of a key 49 which is welded or otherwise secured to the inside of hub 48 and enters a keyway or slot 50 formed in the outer end of the drive shaft. The drum is maintained in position on the drive shaft by a nut 51 threaded onto the outer end of the spindle 34.

A spool comprising a hub 52, a front wall 53, and a back or rear wall 54, is adapted to be mounted on the outer end of the spindle beyond the drum retaining nut 51 and is supported thereon for free rotation upon a bushing 55. A washer 56 is interposed between the rear face of the back wall 54 of the spool and the drum retaining nut 51.

The peripheral edge of the front wall 53 of the spool is provided with an inwardly extending projection 57 for a purpose that will be subsequently described. The rear wall 54 of the spool is formed with a rearwardly extending peripheral flange 58 which extends beneath the forward edge 59 of the peripheral wall of the drum 46. This latter construction serves to prevent fishing line being wound on the spool from getting behind the back wall of the spool and thereby becoming entangled.

The spool itself is maintained on the outer end of the hollow spindle by my novel drag attachment. This attachment comprises a drag rod 60 extending completely through the spindle and having a plate 61 secured to its forward end, its rear end being threaded and being adapted to extend beyond the flanged end 35 of the spindle. A key 62 is secured as by welding to the drag rod 60, and to the plate 61 if desirable, and is adapted when the drag attachment is in operative position to enter a keyway or slot 63 in the outer end of the spindle whereby the drag attachment is maintained non-rotatable. A drag adjusting nut 64 is threaded onto the rear end of the drag rod 60, which is adjacent the crank 43 of the reel, and abuts against the flanged end 35 of the spindle. A friction disc or pad 65 is interposed between the plate 61 of the drag attachment and the front wall 53 of the spool. When the adjusting nut 64 is screwed onto the drag rod 60 and abuts the flanged end 35 of the spindle the plate 61 is drawn toward the spool and forces the friction disc 65 against its front wall 53, is drawn toward the spool and thereby imposing a drag or resistance to rotation upon the spool. It will be apparent that the degree of drag imposed upon the spool may be readily varied by this means from zero to a very substantial amount and that this adjustment may be easily performed on the same side of the reel at which the reel operating crank 43 is located.

Referring now to Figs. 4 through 10 the apparatus by which line may be wound upon the spool will be described. A line hook 70 is supported outside the peripheral wall 46 of the drum on a bracket 71 having slots 72 formed therein either of which is adapted to fit over the flatted outer end 73 of a line hook shaft 74, which is supported in a bushing 75 welded or otherwise secured to the webbing 47 of the drum. The bracket 71 is provided with a loop 76 which receives one end of the line hook 70. This end of the line hook 70 is provided with a notch, the bracket being provided with a corresponding slot 77. A lock washer 78 having an opening 79 therein to receive the upper end of the line hook shaft 74 is adapted to fit over the bracket 71 and is provided with a projection 80 which fits into the slot 77 and into the notch of the line hook 70 to hold the line hook in the bracket. The assembly of the line hook 70, the bracket 71 and the lock washer 78 is secured to the outer end of the line hook shaft 74 by a screw 75 and when so secured the line hook is prevented from moving relatively to the line hook shaft 74.

Figure 4:
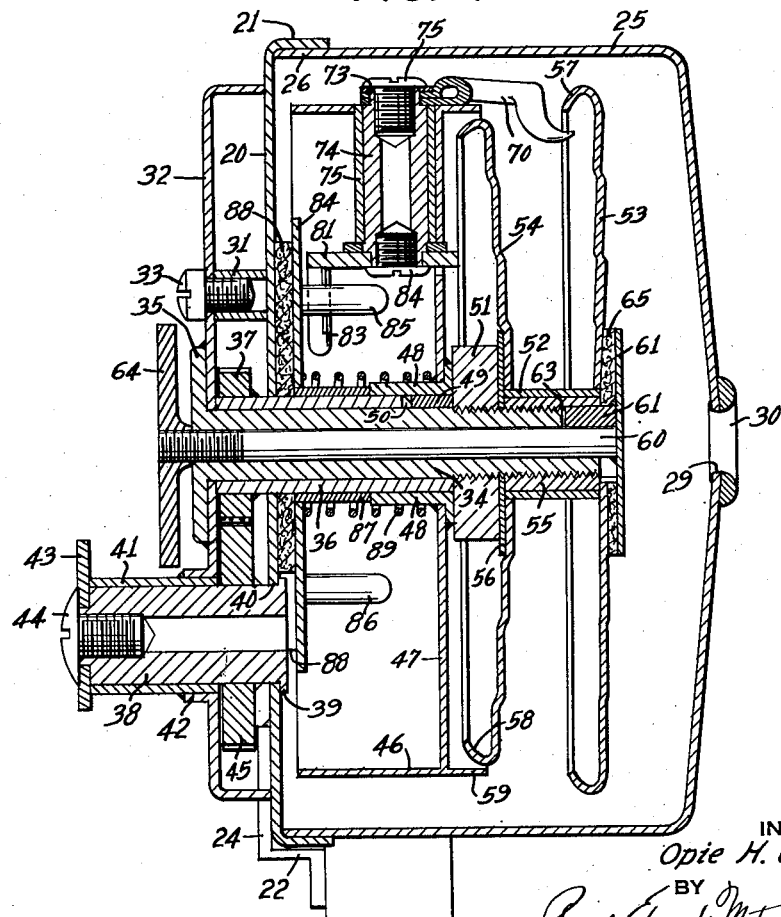
Fig. 4 is a sectional view of one form of reel taken along line 4—4 of Fig. 1.
Figure 5:
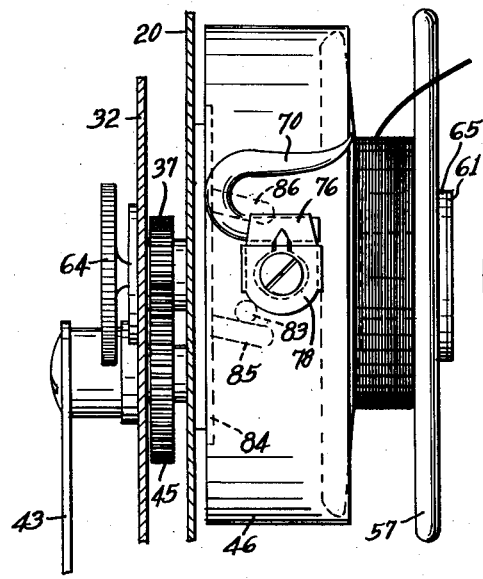
Fig. 5 is a plan view of the reel shown in Fig. 4, partly in section, and having its cover removed to show the line hook in retracted position.
Figure 6:
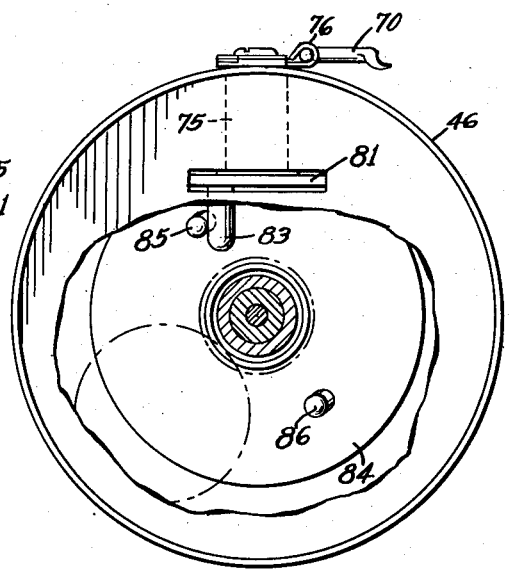
Fig. 6 is an elevational view of the reel of Fig. 5 with the spool removed and a portion of the drum webbing broken away.
Figure 7:
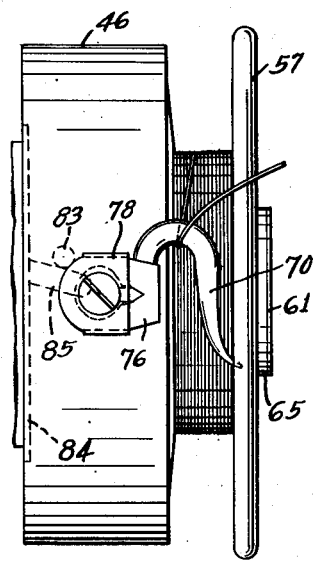
Fig. 7 is a view similar to Fig. 5 which shows the line hook in line pick-up position.
Figure 8:
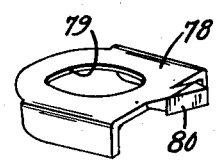
Figs. 8 and 9 are perspective views of the parts forming the means for securing the line hook to the line hook shaft.
Figure 9:
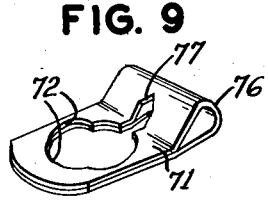
Figure 10:
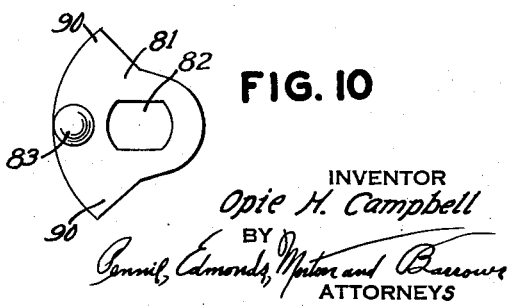
Fig. 10 is a plan view of the means secured to the inner end of the line hook shaft of the spinning reel of Fig. 4 for rotating the shaft.

A plate 81, seen most clearly in Fig. 10 is provided with a slotted opening 82, adapted to receive the inner end of the line hook shaft 74, and with a pin 83, is adapted to be secured to the inner end of the line hook shaft 74 by a screw 84. Rotation of the plate 81 about the axis of the line hook shaft 74 causes the line hook shaft and the supported line hook to be rotated. By this means the line hook may be moved to line pick-up position as illustrated in Figs. 4 and 7, or to its retracted position at which line may be freely withdrawn from the spool, as best illustrated in Figs. 5 and 6. It will be noted that when in line pick-up position the distal end or tip of the line hook 70 extends outwardly below the inwardly extending peripheral projection 57 of the front wall 53 of the spool. By reason of this it is assured that line will be picked up by the line hook when it is rotated in its line pick-up position.

A substantially circular plate 84 (Figs. 4 and 6) provided with a pair of pins 85 and 86 is freely supported on a spacer bushing 87 which in turn is mounted on the drive shaft 36. A friction disc or pad 88 is also mounted on the drive shaft and is located between the plate 84 and the front face of casing 20. A coil spring 89 is maintained in compression, encircling the drive shaft, between the webbing 47 of the drum and the circular plate 84 and serves to maintain the plate 84 in contact with the friction disc 88 whereby free rotation of the plate 84 about the drive shaft 36 is prevented. This apparatus cooperates with the plate 81 and the pin 83, supported by the line hook shaft 74, to move the line hook into and out of line pick-up position.

Its operation is as follows: When the drum is rotated by the drive shaft 36 in one direction the pin 86 will engage the pin 83 and rotate the line hook shaft 74 to move the line hook to its retracted position as shown in Fig. 5 and when the drum is rotated in the opposite direction the pin 85 will engage the pin 83 to rotate the line hook shaft 74 to move the line hook to line pick-up position as shown in Figs. 4 and 7. For the purposes of initiating the rotation of plate 81 and line hook shaft 74, pins 85 and 86, as may be seen in Fig. 6, extend at about an angle of 80 degrees from the plane of the circular plate 84. Furthermore, in order to limit the rotation of the line hook shaft 74 and to prevent the pin 83 from moving far enough to the right as seen in Fig. 4 so that it will not be engaged by either the pin 85 or 86, the plate 81 is so shaped (see Fig. 10) that its shoulders 90 engage the webbing 47 of the drum to prevent but limited rotation.

As was initially stated, the reel of Figs. 1 through 10 is a left-hand reel, that is it is shaped to be operated for reeling in line by rotation of the crank 43 in a counterclockwise direction as seen in Fig. 1, and is adapted to be operated to permit casting, that is, to be operated to retract the line hook 70 from its line pick-up position, by rotation of the crank 43 in a clockwise direction as seen in Fig. 1. However, the reel as illustrated may be very simply modified to operate as a right-hand reel by the following minor changes.

First of all, a different line hook should be mounted in bracket 71, that is, one designed for right-hand operation of the reel. Such a line hook however may be generally similar to that shown but will obviously have to be differently bent so that its distal end will extend beneath the peripheral projection 57 of the spool 53. Secondly, the bracket 71 must be removed from the line hook shaft 74 and replaced thereon by means of the second slot 72 so that its position would be 90 degrees clockwise of the showing in Fig. 7. In this position a right-hand line hook will be in a retracted position. The third minor change which is not absolutely necessary for temporary use of the reel as a right-handed reel but which is desirable if the reel shown is to be manufactured for relatively permanent use as a right-handed reel, is to form the threads on the outer end of the spindle 34 as right-hand threads rather than as left-hand threads which are desirable for use in the left-handed reel.

It may be stated here, if it is not already apparent, that little more than one-half a revolution of the crank shaft 43 need be made to move the line hook from one of its positions to the other and that no manual operation other than that of turning the crank 43 need be employed to accomplish this end.

Referring now to Figs. 11 through 14, a modified reel (again one for left-hand operation) which in all major respects is similar to that illustrated and described in connection with Figs. 1 through 10 will be described. The major difference between this reel and that shown in Figs. 1 through 10 is the apparatus for rotating the line hook about the spool and for moving it to line pick-up position and to its retracted position. Before this is described, however a few minor differences might be noted.

The first of these minor differences is in the construction of the spool. It will be noted in this respect that the rearwardly extending flange 58 formed at the periphery of the back wall 54 of the spool is at right angles thereto while in the previous reel it was at about 60 degrees thereto. Also, the inwardly extending projection 57 formed on the periphery of the front wall 53 of the spool is slightly different. Both of these differences, however, are merely matters of choice as either spool may be used equally well in either reel. The spool of the reel of Figs. 11 through 14 is perhaps preferable as it may be somewhat easier and less expensive to manufacture.

Another minor difference in the reels is in the design of the drag adjusting nut 64. This difference, however, is readily apparent by a comparison of Figs. 4 and 11, and it is again merely a matter of choice of design and need not further be described.

In the modified form of spinning reel shown in Figs. 11 through 14 the line hook 70 is supported on the line hook shaft 74 in the same manner as it is in the previously described reel. Furthermore, the line hook shaft 74 is similarly mounted in a bushing 75 which is secured to the webbing 100 of a slightly different form of drum having a peripheral wall 101. This drum is provided with a hub 102 which is secured to a bearing or bushing 103 freely mounted on a drive shaft 104. A segmental bevel gear 105 (having teeth only throughout about 180 degrees of its circumference) is secured to the inner end of the line hook shaft 74 by a screw 106. By means of this gear 105 the line hook shaft may be rotated to move the line hook to line pick-up position or to its retracted position. A second similar bevel gear 107 which engages bevel gear 105 is mounted on drive shaft 104 and is secured thereto against rotation by reason of a flat 108 formed on the drive shaft. This bevel gear 107 is maintained in position by a friction plate 109 urged against it by a nut 110 which is threaded on the threaded end of the spindle 34 and to which the friction plate 109 is secured as by welding.

Upon rotation of the drive shaft 104 bevel gear 107 is rotated thereby in turn rotating the bevel gear 105 and the line hook shaft 74. Depending upon the direction of rotation of the drive shaft the line hook 70 will be moved to either line pick-up position or to its retracted position.

In order, however, that the gear 105 will be rotated by the gear 107 when the latter is rotated, it is necessary that the drum be held against rotation itself until at least a small degree of relative rotation between it and gear 107 is achieved. This is accomplished by means of a pair of friction devices supported on a pair of lugs 111 secured to the webbing 100 of the drum. These friction devices comprise wire rods 112 which support at their outer ends friction pads 113 which are adapted to rest against the friction plate 109. Thus when the bevel gear 107 is rotated and attempts to rotate the gear 105 any tendency on the part of the drum to rotate itself, thereby avoiding the necessity for the rotation of gear 105, is overcome because the friction devices just described provide sufficient resistance to the rotation of the drum to cause bevel gear 105 to rotate first.

A second pair of lugs 114 and 115 is also provided in addition to the lugs 111 for a purpose to be now described.

By reference to Fig. 14 it will be noted that the bevel gear 107 is provided with wing sections 116 and 117 on which are formed, respectively, lugs 118 and 119. When the bevel gear 107 has been rotated sufficiently in one direction so that its lugs 118 and 119 engage the lugs 111, the line hook 70 will have been moved to its line pick-up position and further rotation of gear 107 will cause or effect rotation of the drum to wind line upon the spool. Rotation of the bevel gear 107 in the opposite direction will cause retraction of the line hook 70 until the lugs 118 and 119 engage the pair of lugs 114 and 115 at which point continued rotation of the bevel gear 107 in this direction will serve no useful purpose. However, the pair of lugs 114 and 115 is provided primarily to make it possible to modify this reel so that it will operate as a right-hand reel, these lugs then performing the function of lugs 111. Such modification of the reel now being described to change it to a right-hand operating one is exactly the same as was required to make the same change in the reel of Figs. 1 through 10 and therefore need not be described.

A stabilizer spring member 120 supported by the lug 115 and extending to the peripheral wall 101 of the drum may be provided to exert a very slight force against the lug 119 of the gear 107 to prevent unnecessary play between that lug and the lug 111 when the gear 107 is driven to wind line upon the spool. It will serve the same function in a right-hand reel without modification except it will then cooperate with the lug 115.

It will be apparent from the above description of two forms of spinning reels constructed in accordance with my invention that various modifications might be made without departing from the scope of my invention and it should, therefore, be understood that my invention should not be limited except to the extent set forth in the appended claims.

I claim:

1. In a spinning reel the combination of a casing, a spindle supported by the casing, a hollow drive shaft mounted on and concentric with the spindle, means mounted on the casing for rotating the drive shaft on the spindle, a spool for fishing line mounted on said spindle adjacent one end of the drive shaft, said spool having a front wall and a rear wall, the front wall having an inwardly extending projection around its periphery and the back wall having a rearwardly extending peripheral flange, a drum supported by and concentric with the drive shaft and adapted to be rotated thereby, a line hook supported substantially at the peripheral surface of said drum, means supported by said drum inwardly from the peripheral surface thereof for moving the line hook into line pick-up position and for retracting it therefrom, and means independent of said drum and supported by said drive shaft which cooperates with the line hook moving means when the drum is rotated in one direction to move the line hook into line pick-up position and when the drum is rotated in the opposite direction to retract it therefrom, the distal end of said line hook when in line pick-up position extending beneath the inwardly extending projection on the periphery of the front wall of the spool, and the peripheral surface of the drum extending over the rearwardly extending flange of the back wall of the spool.

2. In a spinning reel the combination of a casing, a spindle supported by the casing and extending a substantial distance forward of its point of support by the casing, said spindle having an axial bore extending therethrough, a hollow drive shaft mounted on and concentric with the spindle and located toward the rear end of the spindle, a spool for fishing line mounted for free rotation on the forward end of the spindle, a rotatable drum supported on the drive shaft and having a line hook which is adapted to wind line on the spool when the drum is rotated, a driving gear secured to the drive shaft at its rear end, means supported by the casing and extending rearwardly therefrom for rotating said drive shaft, said means including a gear which engages the driving gear on the drive shaft, a drag rod extending through the bore in the spindle and through the casing and adapted to extend slightly beyond either end of the spindle and rearwardly of the casing, the rear end of said rod being threaded, an adjusting nut threaded on the threaded end of the rod and abutting the adjacent end of the spindle, and a plate secured to the opposite or forward end of the drag rod and overlying a portion of the front wall of the spool, said plate being adapted to frictionally engage the front wall of said spool, when the adjusting nut on the rear end of the drag rod is threaded onto said rod, whereby rotation of the spool on the spindle may be restrained to varying degrees depending upon the amount that the adjustment nut is screwed onto the drag rod.

3. In a spinning reel the combination as set forth in claim 2 which includes a friction disc interposed between the friction plate and the front wall of the spool and adapted to be compressed therebetween.

4. In a spinning reel the combination as set forth in claim 2 which includes a slot formed in the forward end of the spindle and a key secured to the outer end of the drag rod and adapted to be received in the spindle slot whereby the drag rod is nonrotatable relative to the spindle.

5. In a spinning reel the combination of a casing, a spindle supported by the casing, a hollow drive shaft mounted on and concentric with the spindle, means mounted on the casing for rotating the drive shaft on the spindle, said spindle also being adapted to support a spool for fishing line, a drum supported by and concentric with the drive shaft and adapted to be rotated thereby, a line hook, a line hook shaft supported by the drum substantially at right angles to the axis of the drum and extending through the peripheral wall of the drum, means for securing the line hook to the outer end of said line hook shaft, means secured to the inner end of the line hook shaft for rotating said line hook shaft to move the line hook into line pick-up position and to retract it therefrom, means independent of the drum and supported by the drive shaft which is engageable with the means for rotating the line hook shaft so that when the drive shaft is rotated and there is relative movement between the means on the inner end of the line hook shaft and the means independent of said drum in one direction the line hook is moved into line pick-up position and when there is relative motion in the opposite direction the line hook is retracted from line pick-up position, and friction means for assuring such relative movement during initial rotation of the drive shaft in each direction until the line hook is in one of its limiting positions.

6. In a spinning reel the combination set forth in claim 5 in which the drum is secured directly to the drive shaft for rotation thereby, in which the means secured to the inner end of the line hook shaft comprises a plate extending generally in a plane at right angles to the axis of the line hook shaft and having a pin supported by it substantially radially of the drum, and in which the means independent of the drum comprises a circular plate supported by the drive shaft at right angles to the axis thereof and having a pair of pins mounted on it and extending outwardly from it, one of said pair of pins being adapted to engage the pin supported by the line hook shaft when the drum is rotated in one direction whereby the line hook is moved to line pick-up position, and the other of said pair of pins being adapted to engage the pin of the line hook shaft when the drum is rotated in the opposite direction whereby the line hook is retracted from line pick-up position.

7. In a spinning reel the combination as set forth in claim 6, in which said friction means includes a friction disc interposed between the drive shaft supported circular plate and the casing and a spring surrounding the drive shaft and urging the circular plate against the friction disc, whereby the circular plate is held stationary relative to the drive shaft until one of the pins supported by it is engaged by the pin of the line hook shaft with sufficient force to overcome the frictional resistance.

8. In a spinning reel the combination as set forth in claim 6 in which the lug supporting plate secured to the inner end of the line hook shaft limits rotation of the line hook shaft to approximately 90 degrees by engaging a portion of the drum.

9. In a spinning reel the combination as set forth in claim 5 in which the drum is freely supported on the drive shaft, in which the means supported on the inner end of the line hook shaft comprises a 180 degree bevel gear, and in which the means independent of said drum comprises a bevel gear secured to the drive shaft for rotation thereby and engageable with the bevel gear supported by the line hook shaft whereby when the drive shaft is rotated in one direction the line hook shaft is rotated to move the line hook into line pick-up position and when the drive shaft is rotated in the opposite direction the line hook shaft is rotated to retract the line hook from line pick-up position.

10. In a spinning reel the combination as set forth in claim 9 which includes a pair of lugs formed on the bevel gear secured to the drive shaft, and a pair of lugs affixed to the drum, said pairs of lugs being adapted to engage each other when the drive shaft supported bevel gear is rotated, whereby the drum is rotated thereby.

11. In a spinning reel the combination as set forth in claim 10 in which said friction means includes a substantially circular friction plate nonrotatably secured to the spindle adjacent the bevel gear supporting end of the drive shaft and means supported by the drum and frictionally engaging said friction plate, whereby the drum is held stationary until said pairs of lugs engage each other.

OPIE H. CAMPBELL.

References Cited in the file of this patent

UNITED STATES PATENTS

| Number | Name | Date |
|---|---|---|
| 1,140,868 | Bennett | May 25, 1915 |
| 1,187,840 | Illingworth | June 20, 1916 |
| 1,687,579 | McMullan | Oct. 16, 1928 |
| 2,282,156 | Benes | May 5, 1942 |
| 2,363,533 | King | Nov. 28, 1944 |
| 2,498,987 | Duncan | Feb. 28, 1950 |
| 2,507,457 | Rix | May 9, 1950 |
| 2,521,543 | Shakespeare et al. | Sept. 5, 1950 |

FOREIGN PATENTS

| Number | Country | Date |
|---|---|---|
| 804,230 | France | July 27, 1936 |
| 195,577 | Switzerland | Mar. 2, 1938 |
| 598,412 | Great Britain | Feb. 18, 1948 |